March 18, 1952     E. P. DIEFENBACH     2,589,349
MAGNETIC KEY CASE
Filed Nov. 10, 1948

Inventor
ERVIN P. DIEFENBACH
By Wheeler, Wheeler & Wheeler
Attorneys

Patented Mar. 18, 1952

2,589,349

UNITED STATES PATENT OFFICE 2,589,349

MAGNETIC KEY CASE

Ervin P. Diefenbach, Milwaukee, Wis.

Application November 10, 1948, Serial No. 59,353

4 Claims. (Cl. 206—19.5)

This invention relates to a magnetic key case.

It is a primary object of the invention to provide simple and inexpensive means for safely carrying a spare automobile key or the like in any desired location in or about the engine or chassis of a vehicle. The invention is also adapted for analogous use elsewhere. The nature of the invention will be more clearly apparent from the following disclosure.

Figure 1:
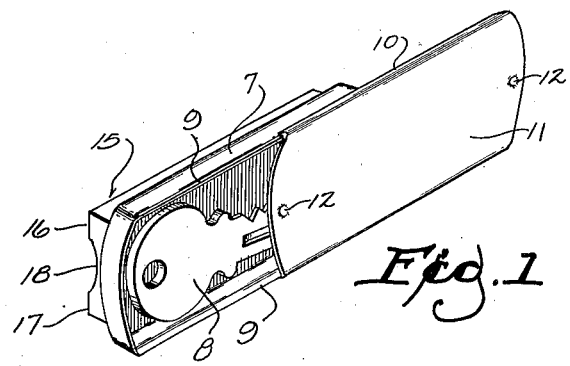
Fig. 1 is a view in perspective showing an embodiment of the invention with a key disposed in a compartment which is illustrated with the cover partly open.
Figure 2:
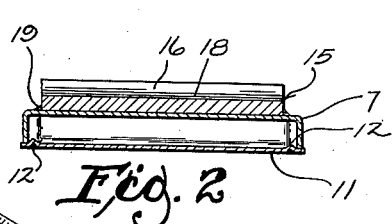
Fig. 2 is a view taken in longitudinal section through the device of Fig. 1.
Figure 3:
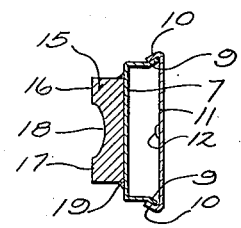
Fig. 3 is a view taken in transverse section through the device of Fig. 1.

The device as shown in Figs. 1, 2 and 3 comprises a shallow box 7 of dimensions just adequate for receiving the ignition key 8 of an automobile. The side margins of the container 7 are flanged slightly outwardly at 9 in the manner best illustrated in Fig. 3 for interlock with the inwardly turned flanges 10 of the sliding cover 11. The cover may have its face portion slightly embossed inwardly at 12 for yieldable engagement with the ends of the container 7 to keep the cover from accidental displacement from the position in Fig. 2.

Adhered to the bottom of the container 7 is a magnet 15 which preferably has its polar faces 16, 17 defined by a longitudinal channel 18. This magnet may be attached to the container in any desired manner, as by welding at 19. It will securely hold the container 7 and its contents to any metallic surface in any desired position, a highly magnetic alloy preferably being employed in the magnet. Thus, a spare automobile key placed in this container will be securely held to any desired portion of an automobile frame axle, or engine, where it will be instantly accessible but will not be readily visible to an unauthorized person.

Figure 4:
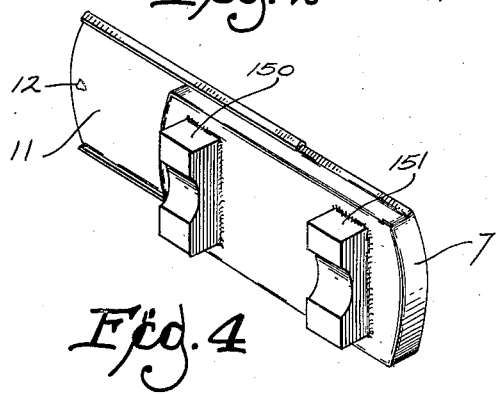
Fig. 4 is a view in bottom perspective of a modified embodiment of the invention.

The device shown in Fig. 4 is identical with that shown in Figs. 1, 2 and 3 except that two separate smaller magnets 150 and 151 are substituted for the single elongated magnet shown at 15.

Figure 5:
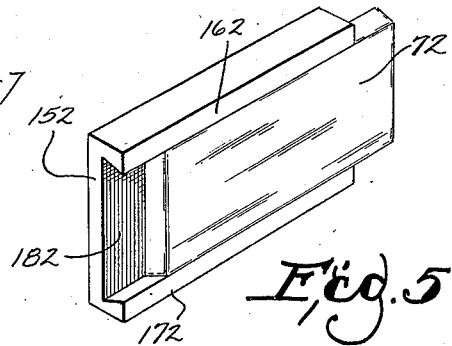
Fig. 5 is a view in perspective showing a further modified embodiment of the invention.
Figure 6:
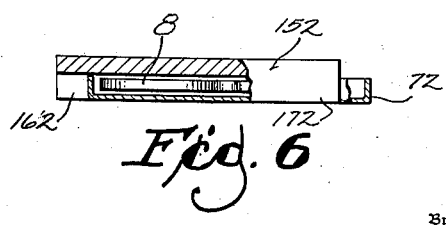
Fig. 6 is a view partially in side elevation and partially in longitudinal section through the device of Fig. 5.

The device shown in Figs. 5 and 6 is preferred, since it reduces cost of manufacture and eliminates one part, as well as eliminating a welding or cementing operation. In this construction, the magnet 152 is provided between its polar flanges 162 and 172 with a channel 182 which has a dovetailed shape in cross section. The receptacle for the key comprises a shallow pan at 72, the flaring sides of which fit between the polar flanges 162 and 172 to enable the pan to slide longitudinally of the magnet. The key 8 is simply placed in the pan 72, and the pan is inserted into the dovetail slide provided by the magnet body itself, thereby securely confining the key. Yet, the pan, even if made of thin ferrous metal, instead of plastic, does not so greatly short circuit the magnetic flux paths between the polar flanges as to prevent these from adhering securely to any iron object to which they may be applied.

I claim:

1. A key container comprising a shallow pan member and a closure member for said pan, one of said members having spaced and permanent magnetic poles extending longitudinally of its sides and in fixed connection therewith, said poles being exposed and of sufficient strength for the magnetic mounting and support of said pan and the contents thereof against a magnetic surface, said poles projecting from the said closure to form flanges, between which flanges the pan is movable respecting the closure and poles.

2. A device of the character described comprising a shallow pan with flaring sides in combination with an elongated magnet having a body portion and polar flanges, the polar flanges being laterally engaged with the sides of said pan, and the pan being slidable between said flanges.

3. A device of the character described comprising the combination with a permanent magnet having a body portion provided with laterally spaced legs and having a slot of dovetailed cross section between such legs, and a shallow container with flaring sides complementary to the cross section of said slot and slidable in said slot between said legs, the magnet constituting a closure for the container.

4. A magnetic key support comprising the combination with a magnet having laterally spaced elongated polar flanges and a channel therebetween, of key confining means slidably connected with the magnet within said channel and including end walls disposed transversely of the channel.

ERVIN P. DIEFENBACH.

REFERENCES CITED

The following references are of record in the file of this patent:

UNITED STATES PATENTS

| Number | Name | Date |
|---|---|---|
| 407,477 | Ezell | July 23, 1889 |
| 1,624,741 | Leppke et al. | Apr. 12, 1927 |
| 1,769,415 | Byberg | July 1, 1930 |
| 1,952,596 | Lashar | Mar. 27, 1934 |
| 2,083,356 | Batdorf | June 8, 1937 |
| 2,144,184 | Hale et al. | Jan. 17, 1939 |
| 2,164,623 | Posner | July 4, 1939 |
| 2,217,514 | Henry | Oct. 8, 1940 |
| 2,283,543 | Draper et al. | May 19, 1942 |
| 2,487,897 | Rozsa et al. | Nov. 15, 1949 |